(12) United States Patent
Lee et al.

(10) Patent No.: US 7,647,429 B2
(45) Date of Patent: Jan. 12, 2010

(54) PROVIDING MULTICAST SERVICES IN A POINT-TO-MULTIPOINT MANNER FOR A RADIO COMMUNICATION SYSTEM

(75) Inventors: Young Dae Lee, HaNam-shi (KR); So Young Lee, Gyeonggi-Do (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 10/666,647

(22) Filed: Sep. 19, 2003

(65) Prior Publication Data

US 2005/0165945 A1 Jul. 28, 2005

(30) Foreign Application Priority Data

Sep. 19, 2002 (KR) .................. 10-2002-0057469

(51) Int. Cl.
*G06F 15/16* (2006.01)
(52) U.S. Cl. .................. 709/247; 709/246; 709/204; 709/230; 709/231
(58) Field of Classification Search .................. 709/246, 709/247, 230, 231, 204, 205, 207
See application file for complete search history.

(56) References Cited

U.S. PATENT DOCUMENTS

| | | | | |
|---|---|---|---|---|
| 7,266,105 | B2 * | 9/2007 | Wu | 370/338 |
| 7,327,734 | B2 * | 2/2008 | Yi et al. | 370/394 |
| 7,382,732 | B2 * | 6/2008 | Peisa et al. | 370/236 |
| 7,394,807 | B2 * | 7/2008 | Hamiti et al. | 370/389 |
| 2002/0093938 | A1 * | 7/2002 | Tourunen | 370/349 |

(Continued)

FOREIGN PATENT DOCUMENTS

EP 1122925 1/2004

(Continued)

OTHER PUBLICATIONS

3rd Generation Partnership Project; Technical Specification Group Radio Access Network; Introduction of the Multimedia Broadcast Multicast Service (MBMS) in the Radio Access Network (stage-2); 3GPP TS 25.346, vol. 2.1.0; Jun. 2003.

(Continued)

*Primary Examiner*—Kenny S Lin
*Assistant Examiner*—Hieu T Hoang
(74) *Attorney, Agent, or Firm*—Lee, Hong, Degerman, Kang & Waimey

(57) ABSTRACT

Data for a multicast service is provided by a radio communication system by performing header compression and employing a packet data convergence protocol (PDCP) entity that exists for every specific MBMS service to be provided for a cell with users therein. The particular network component (e.g., in a SRNC or a CRNC) that includes one PDCP layer for each specific MBMS service depends upon certain characteristics of the terminals (UE) located within a cell that wish to receive the specific MBMS service. The terminal receives via a common transport channel and restores (i.e., decompresses) the header-compressed data of the MBMS service that was transmitted after header compression at the CRNC, while the terminal receives via a dedicated transport channel and restores (i.e., decompresses) the header-compressed data of the MBMS service that was transmitted after header compression at the SRNC.

33 Claims, 5 Drawing Sheets

U.S. PATENT DOCUMENTS

| | | | |
|---|---|---|---|
| 2002/0150085 A1* | 10/2002 | Flinck et al. | 370/352 |
| 2003/0007490 A1* | 1/2003 | Yi et al. | 370/394 |
| 2003/0007517 A1* | 1/2003 | Beckmann et al. | 370/537 |
| 2003/0035423 A1* | 2/2003 | Beckmann et al. | 370/390 |
| 2003/0081592 A1* | 5/2003 | Krishnarajah et al. | 370/352 |
| 2003/0087653 A1* | 5/2003 | Leung et al. | 455/502 |
| 2004/0010609 A1* | 1/2004 | Vilander et al. | 709/230 |

FOREIGN PATENT DOCUMENTS

| | | |
|---|---|---|
| JP | 2001-016275 | 1/2001 |
| JP | 2001-223732 | 8/2001 |
| JP | 2001-244993 | 9/2001 |
| JP | 2001-298407 | 10/2001 |
| JP | 2002-141931 | 5/2002 |
| JP | 2002-165262 | 6/2002 |
| JP | 2002-541722 | 12/2002 |
| JP | 2002-541724 | 12/2002 |
| JP | 2004-527769 | 9/2004 |
| KR | 10-2002-0001729 | 1/2002 |
| KR | 10-203-28593 A | 4/2003 |
| KR | 10-2003-32875 A | 4/2003 |
| WO | WO 98/25422 | 6/1998 |
| WO | 99/08457 | 2/1999 |
| WO | 01/65817 | 3/2000 |
| WO | WO 00/46929 | 8/2000 |
| WO | WO 00/60785 | 10/2000 |
| WO | WO 00/60795 | 10/2000 |
| WO | 2004/002021 | 12/2003 |

OTHER PUBLICATIONS

LG Electronics, Inc., TSG-RAN Working Group 2 Meeting #32; Use of DSCH for MBMS Multicast Mode; R2-022573, Sep. 23, 2002.

* cited by examiner

PROVIDING MULTICAST SERVICES IN A POINT-TO-MULTIPOINT MANNER FOR A RADIO COMMUNICATION SYSTEM

CROSS-REFERENCE TO RELATED APPLICATIONS

Pursuant to 35 U.S.C. § 119(a), this application claims the benefit of earlier filing date and right of priority to the Korean Application No. 10-2002-57469, filed on Sep. 19, 2002, the content of which is hereby incorporated by reference herein in its entirety.

BACKGROUND OF THE INVENTION

1. Field of the Invention

The present invention relates to a multicast service of a mobile communication system and, more particularly, to allowing multicasting of data services in a point-to-multipoint manner using a structure of a PDCP layer suitable for a multimedia broadcast/multicast service (MBMS), and its operation method.

2. Description of the Background Art

With the remarkable development in radio mobile communication technology, mobile phones are used more than wired phones. However, for a service providing a large amount of data communications above general voice communications through a radio access network, radio mobile communication technology is behind in its performance compared to that of the existing cable communication system. A communication system enabling a large amount of data communication is called an IMT-2000, for which technological developments and standardization are ongoing in many countries worldwide.

A universal mobile telecommunications system (UMTS), which is a European IMT-2000 system, is a third generation mobile communication system that has evolved from a standard known as Global System for Mobile communications (GSM). This standard is a European standard which aims to provide an improved mobile communication service based on a GSM core network and wideband code division multiple access (W-CDMA) technology.

In December 1998, the ETSI of Europe, the ARIB/TTC of Japan, the T1 of the United States, and the TTA of Korea formed a Third Generation Partnership Project (3GPP) for the purpose of creating the specification for standardizing the UMTS.

The work toward standardizing the UMTS performed by the 3GPP has resulted in the formation of five technical specification groups (TSG), each of which is directed to forming network elements having independent operations.

More specifically, each TSG develops, approves and manages a standard specification in a related region. Among them, a radio access network (RAN) group (TSG-RAN) develops a specification for the function, items desired, and interface of a UMTS terrestrial radio access network (UTRAN), which is a new RAN for supporting a W-CDMA access technology in the UMTS.

FIG. 1 shows a network structure of a general UMTS.

As shown in FIG. 1, the UMTS is roughly divided into a terminal (UE: user equipment), a UTRAN and a core network.

The UTRAN includes one or more radio network subsystems (RNS). Each RNS includes an RNC and one or more Node Bs managed by the RNCs.

Node Bs are managed by the RNCs, receive information sent by the physical layer of a terminal (e.g., mobile station, user equipment and/or subscriber unit) through an uplink, and transmit data to a terminal through a downlink. Node Bs, thus, operate as access points of the UTRAN for a terminal.

The RNCs perform functions, which include assigning and managing radio resources, and operate as an access point with respect to the core network.

Each terminal connected to the UMTS network is managed by a specific RNC in the UTRAN, and this RNC is called an SRNC (Serving RNC). The SRNC serves as an access point to the core network in order to transmit data of a specific terminal, and allocates a radio resource suitable for providing a service.

The terminal connected to the core network through the UTRAN has only one SRNC. In general, one RNC is used for connection between the terminal and the RNC, but if the terminal moves into a region managed by a different RNC, it is connected to an SRNC by way of an RNC of the region in which the terminal has moved. Except for the SRNC, every RNC that the terminal goes through is called a DRNC (Drift RNC), and the DRNC performs a simple partial function of routing user data or assigning a code, which is a common resource. That is, the discrimination of the SRNC and the DRNC is a logical discrimination related to a specific terminal.

Meanwhile, the RNC can be discriminated at the Node B according to a dependent relation of the RNC and the Node B in the UTRAN. An RNC which handles managing of a specific Node B is called a CRNC (Controlling RNC), and the CRNC performs functions of controlling a traffic load and congestion in a cell that the CRNC itself manages and a function of controlling acceptance of a new radio link set in the cell. In terms of the structure of the UTRAN, each Node B necessarily has only one CRNC.

The services provided to the specific terminal 10 is roughly divided into a circuit switched service and a packet switched service. For example, a general voice phone call service belongs to the circuit switched service, while a Web browsing service through an Internet connection is classified as the packet switched service.

In case of supporting the circuit switched service, the RNC 20 is connected to the MSC 31 of the core network 30, and the MSC 31 is connected to a GMSC (Gateway Mobile Switching Center) 33 managing a connection to other networks.

Meanwhile, in case of the packet switched service, services are provided by a SGSN (Serving GPRS Support Node) 35 and a GGSN (Gateway GPRS Support Node) 37 of the core network 30.

The SGSN 35 supports a packet communication going toward the RNC 23, and the GGSN 37 manages connections to other packet switched networks such as the Internet.

An interface exists between various network components to allow the network components to give and take information to and from each other to allow mutual communication. A cable interface between the RNC 23 and the core network 30 is defined as an Iu interface. Connection of the Iu interface to the packet switched area is defined as an Iu-PS, and connection of the Iu interface to the circuit switched area is defined as an Iu-CS.

FIG. 2 illustrates a structure of a radio access interface protocol between a terminal and the UTRAN on the basis of 3GPP radio access network standard.

As shown in FIG. 2, the radio access interface protocol includes horizontal layers comprising a physical layer, a data link layer and a network layer, and vertical planes comprising a user plane for transmitting data information and a control plane for transmitting control signals.

The user plane is a region to which traffic information of a user such as voice or an IP packet is transmitted. The control plane is a region to which control information such as an interface of a network or maintenance and management of a call is transmitted.

In FIG. 2, the protocol layers can be divided into L1 (a first layer), L2 (a second layer), and L3 (a third layer) based on three lower layers of an open system interconnection (OSI) standard model well known in the art of communication systems.

The L1 layer provides an information transfer service to the second layer, (which is an upper layer) by using various radio transfer techniques. The L1 layer is connected to the MAC layer through a transport channel, and data is transferred between the MAC layer and the PHY layer through the transport channel.

The L2 layer includes a medium access control (MAC) layer, a radio link control (RLC) layer, a packet data convergence protocol (PDCP) layer and a broadcast/multicast control (BMC) layer.

The MAC layer handles a mapping between the logical channel and the transport channel, and provides a re-allocation service of the MAC parameter for allocation and re-allocation of radio resources.

The MAC layer is connected to the radio link control (RLC) layer (which is an upper layer) through a logical channel, and various logical channels are provided according to the kind of transmitted information.

In general, when information of the control plane is transmitted, a control channel is used. When information of the user plane is transmitted, a traffic channel is used.

The MAC layer is connected to the physical layer (which is a lower layer) through the transport channel, and as the transport channel, a common channel or a dedicated channel is used depending upon whether the channel is shared or not.

The MAC layer is divided into a MAC-b sublayer, a MAC-d sublayer, and a MAC-c/sh sublayer, according to the type of transport channel being managed. The MAC-b sublayer manages a broadcast channel (BCH) handling the broadcast of various data and system information, while the MAC-c/sh sublayer manages a shared transport channel such as a forward access channel (FACH), a downlink shared channel (DSCH), or the like, being shared with other terminals.

In the UTRAN, the MAC-c/sh sublayer is located in a control RNC (CRNC) and manages channels shared by all terminals in a cell, so that one MAC-c/sh sublayer exists for each cell. A MAC-cish sublayer also exists in each terminal 10, respectively The MAC-d sublayer manages a dedicated channel (DCH), which is a dedicated transport channel for a specific terminal 10. Accordingly, the MAC-d sublayer is located in a serving RNC (SRNC) that manages a corresponding terminal 10, and one MAC-d sublayer also exists in each terminal 10.

A radio link control (RLC) layer provides support for reliable data transmissions, and may perform a function of segmentation and concatenation of an RLC service data unit (SDU) coming from a higher layer. The RLC SDU transferred from the higher layer is adjusted in its size according to a throughput capacity at the RLC layer, to which header information is added, and is then transferred to the MAC layer in the form of a protocol data unit (PDU). The RLC layer includes an RLC buffer for storing the RLC SDU or the RLC PDU coming from the higher layer.

A packet data convergence protocol (PDCP) layer is located at an upper layer from the RLC layer, allowing data to be transmitted effectively on a radio interface with a relatively small bandwidth through a network protocol, such as the IPv4 or the IPv6. For this purpose, the PDCP layer performs the function of reducing unnecessary control information used in a wired network, and this function is called header compression. These methods allow transmission of only the absolutely necessary information required in the header part of a data, and thus transmitting a smaller amount of control information can reduce the overall amount of data to be transmitted.

A broadcast/multicast control (BMC) layer schedules a cell broadcast (CB) message transferred from the core network and transmits the cell broadcast message to a specific cell, whereby every terminal positioned in the cell perform the cell broadcast message. Especially, the BMC layer is used for handling only the broadcast function, and the CB message is a short message consisting of a maximum 1230 octets which only include characters and numbers transmitted between terminals or between a terminal and a system.

At the UTRAN 100, the CB message transferred from the upper layer is combined with information, such as a message ID (identification), a serial number, a coding scheme, etc., and transferred to the RLC layer in the form of a BMC message. The BMC message is transmitted to the MAC layer through a common traffic channel (CTCH), which is a logical channel. Here, the logical channel CTCH is mapped to a FACH transport channel, and the FACH transport channel is mapped to a physical channel, that is, a secondary common control physical channel (S-CCPCH).

The radio resource control (RRC) layer located at the lowest portion of the third layer (L3) is only defined in the control plane, and controls the transport channels and the physical channels in relation to the setup, the reconfiguration, and the release (cancellation) of the radio bearers (RBs). Here, the RB signifies a service provided by the second layer (L2) for data transmission between the terminal 10 and the UTRAN 100. In general, the set up of the RB refers to the process of stipulating the characteristics of a protocol layer and a channel required for providing a specific data service, and setting the respective detailed parameters and operation methods.

The RLC layer may be part of the user plane or the control plane in accordance with an upper layer connected thereto. The RLC layer is part of the control plane when data is received from the RRC layer, and the RLC layer is part of the user plane in all other instances.

As can be understood from FIG. 2, regarding the RLC layer and the PDCP layer, a plurality of entities may exist in a single layer thereof. This is because one terminal may have many radio (wireless) carriers, and typically, only one RLC entity and one PDCP entity is used for each radio bearer.

However, the cell broadcast service provided by the existing BMC layer does not only support a multicast function but also have limitations in providing a multimedia service, because it can transmit only a short message with a maximum size of 1230 octets. For this reason, a new service called a multimedia broadcast/multicast service (MBMS) has been proposed.

As shown in FIG. 3, the MBMS is a service for simultaneously transmitting multimedia data such as audio, video or image data to a plurality of terminals by using a uni-directional point-to-multipoint bearer service, which supports a broadcast mode and a multicast mode.

The MBMS is divided into a broadcast mode and a multicast mode. That is, the MBMS is divided into an MBMS broadcast service and an MBMS multicast service.

The MBMS broadcast mode is a service for transmitting multimedia data to every user in a broadcast area. The broadcast area means an area in which a broadcast service is available. One or more broadcast areas may exist in one PLMN, one or more broadcast services can be provided in one broadcast area, and one broadcast service can be provided to several broadcast areas.

The MBMS multicast mode is a service for transmitting multimedia data only to a specific user group existing in a multicast area. The multicast area means an area in which a multicast service is available. One or more multicast areas can exist in one PLMN (public land mobile network), one or more multicast services can be provided in one multicast area, and one multicast service can be provided to several multicast areas.

In general, the MBMS is a service for broadcasting or multicasting multimedia data and the size of a transmitted packet is considerably large. Thus, by compressing a header portion occupying a large part of a packet in the MBMS by using a header compression technique, data transmission efficiency can be improved. Because the MBMS is a uni-directional point-to-multipoint service, a header compressor in the UTRAN at a sending end transmits the same data to header decompressors in the terminals at a receiving end.

As mentioned above, the MBMS can improve data transmission efficiency by compressing the header part of multimedia data by using the header compression technique.

In the conventional art, as shown in FIG. 4, the PDCP layer handling the header compression is positioned at the SRNC of a specific terminal and of UTRAN, and at this time, a compressed packet is transmitted and received through a dedicated transport channel.

In other words, as for the MBMS service provided according to the conventional art, a header part of MBMS data is compressed in a PDCP layer of the SRNC managing a resource of a specific terminal and transmitted to a terminal through the dedicated transport channel.

In this case, because the MBMS service has characteristics of simultaneously broadcasting and multicasting the same data to a plurality of terminals, the number of PDCP entities existing at the SRNC is equal to the number of terminals in a cell for every type of MBMS service.

However, because the MBMS data transmitted after being compressed in the PDCP layer of the SRNC have the same content, the repetitive PDCP entities existing at the SRNC considerably wastes the resources of the UTRAN system and radio resources.

SUMMARY OF THE INVENTION

Therefore, an object of the present invention is to provide a PDCP structure capable of allowing a resource of a UTRAN system and a radio resource to be effectively used.

Another object of the present invention is to provide a PDCP structure in which every specific MBMS service has one PDCP entity for a cell.

Still another object of the present invention is to provide a PDCP structure in which a PDCP layer is provided in a CRNC and to provide a data transmission method thereof.

To achieve at least the above objects in whole or in part, there is provided a PDCP structure in a wireless system which compresses a header of multimedia service data and multicasts it through a downlink, wherein an entity handling a header compression of multimedia service data is positioned in a control center which manages a common resource of multiple terminals of a cell.

Preferably, the entity is a packet data convergence protocol (PDCP) entity.

Preferably, only one entity exists for every specific MBMS service for one cell.

Preferably, the control center is a control radio network controller (CRNC).

Preferably, the header-compressed data is transmitted to a terminal through a common channel, and the common channel is a forward access channel (FACH) or a downlink shared channel (DSCH).

To achieve at least these advantages in whole or in part, there is further provided a radio mobile communication system including: a radio network controller (RNC) for performing a header compression function on multimedia service data; and a plurality of terminals for receiving the header-compressed multimedia service data from the RNC through a common transport channel.

Preferably, the multimedia service is a multimedia broadcast/multicast service (MBMS).

Preferably, the RNC is a control RNC (CRNC) that manages a common resource for multiple terminals.

Preferably, the RNC includes an MBMS handling layer for outputting multimedia data to be transmitted; and a packet data convergence protocol (PDCP) layer for compressing a header of multimedia data.

Preferably, the PDCP layer includes one entity for every specific multimedia service in one cell.

To achieve at least these advantages in whole or in part, there is further provided a data transmission method in a wireless system for compressing a header of multimedia service data and multicasting it through a downlink, including: compressing a header of multimedia service data; and transmitting the header-compressed multimedia service data to plural terminals through a common transport channel.

Preferably, the multimedia service is a multimedia broadcast/multicast service (MBMS).

Preferably, the header compression is performed at a packet data convergence protocol (PDCP) layer, and the PDCP layer exists in a control radio network controller (CRNC).

Preferably, the PDCP layer includes one entity for every specific MBMS service in one cell.

Preferably, the particular network component (e.g., in a SRNC or a CRNC) that includes the PDCP layer for a specific MBMS service depends upon certain characteristics of the terminals (UE) located within a cell that wish to receive the specific MBMS service.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is implemented in a mobile communication system such as a UMTS (Universal Mobile Telecommunications System) developed by 3GPP. However, the present invention can be also applied to a communication system opening in a different standard.

Referring back to the related art, if MBMS data is header-compressed and transmitted, the number of required PDCP entities must equal the total number of terminals for every specific MBMS service to be provided. Accordingly, system resources of the UTRAN and various radio resources are wasted.

Figure 1:
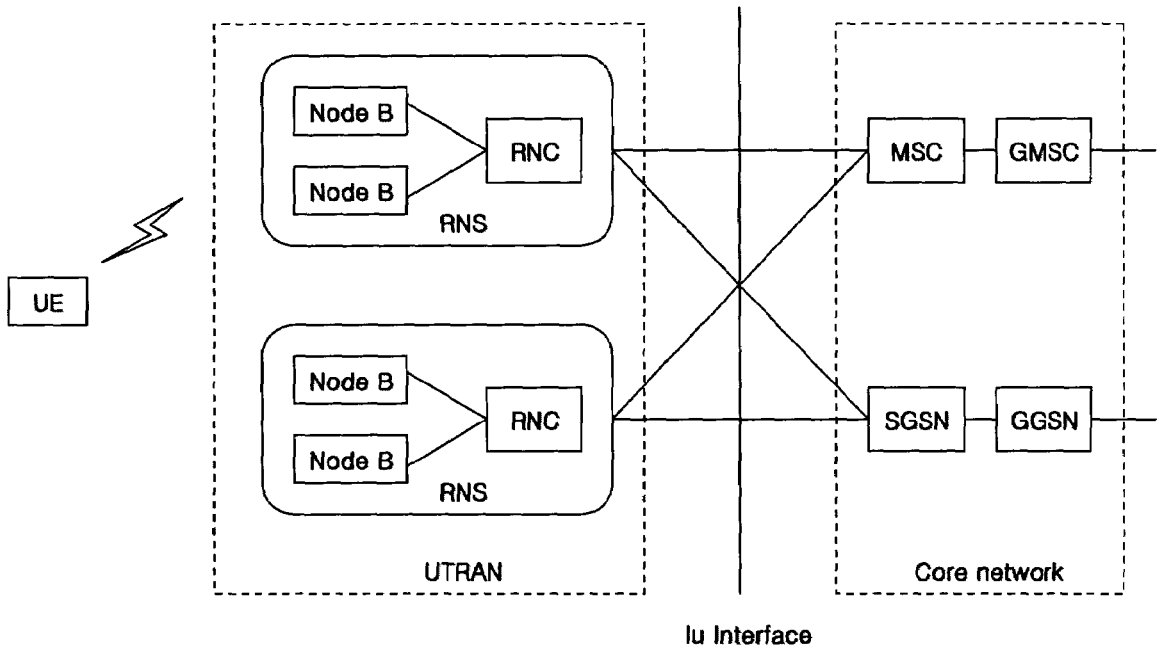
FIG. 1 illustrates a structure of a network of a general UMTS system.
Figure 2:
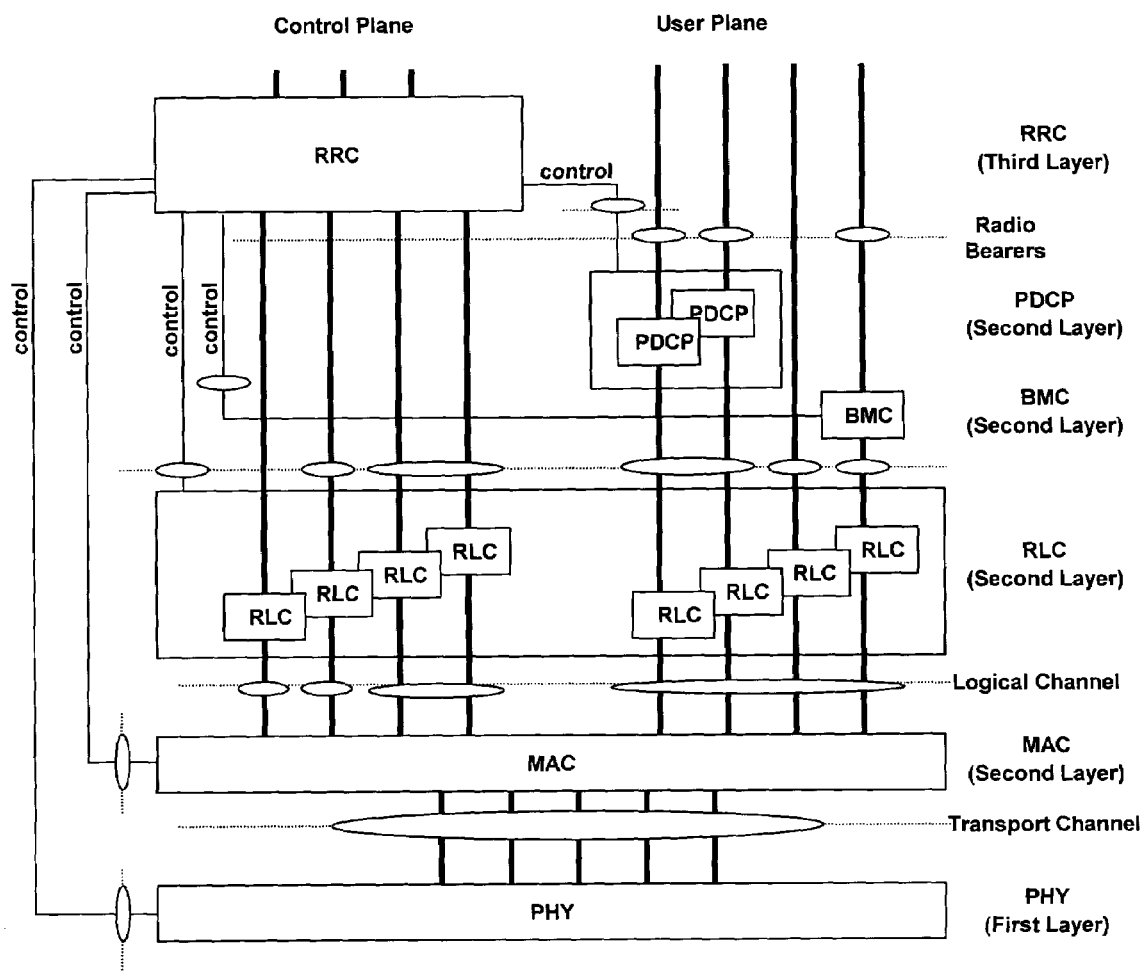
FIG. 2 illustrates a structure of a radio access interface protocol between a terminal and UTRAN on the basis of the 3GPP radio access network standards.
Figure 3:
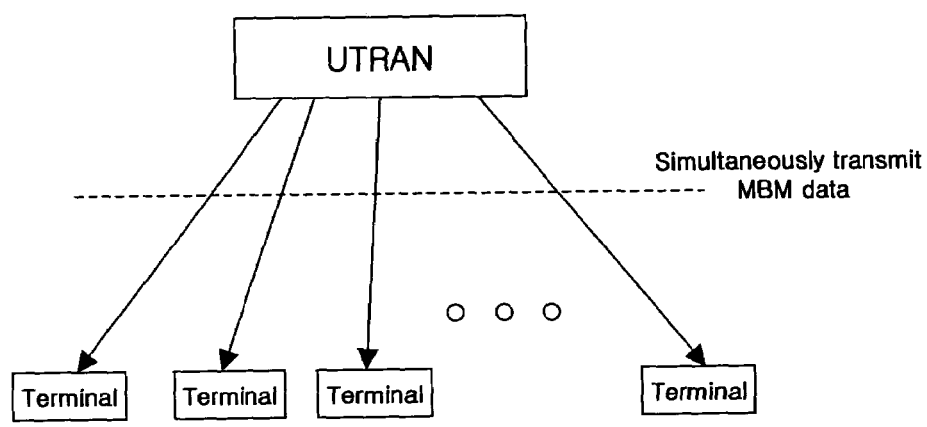
FIG. 3 illustrates a concept of transmission of a general MBMS data.
Figure 4:
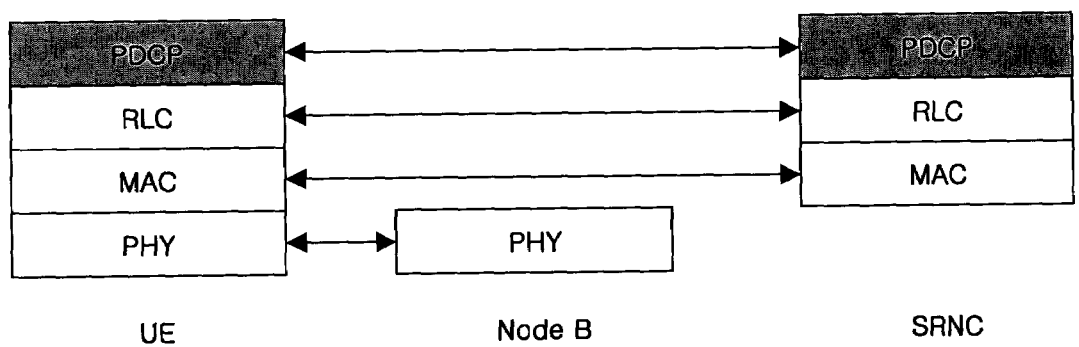
FIG. 4 illustrates a protocol stack for transmission of MBMS data in accordance with a conventional art.
Figure 5:
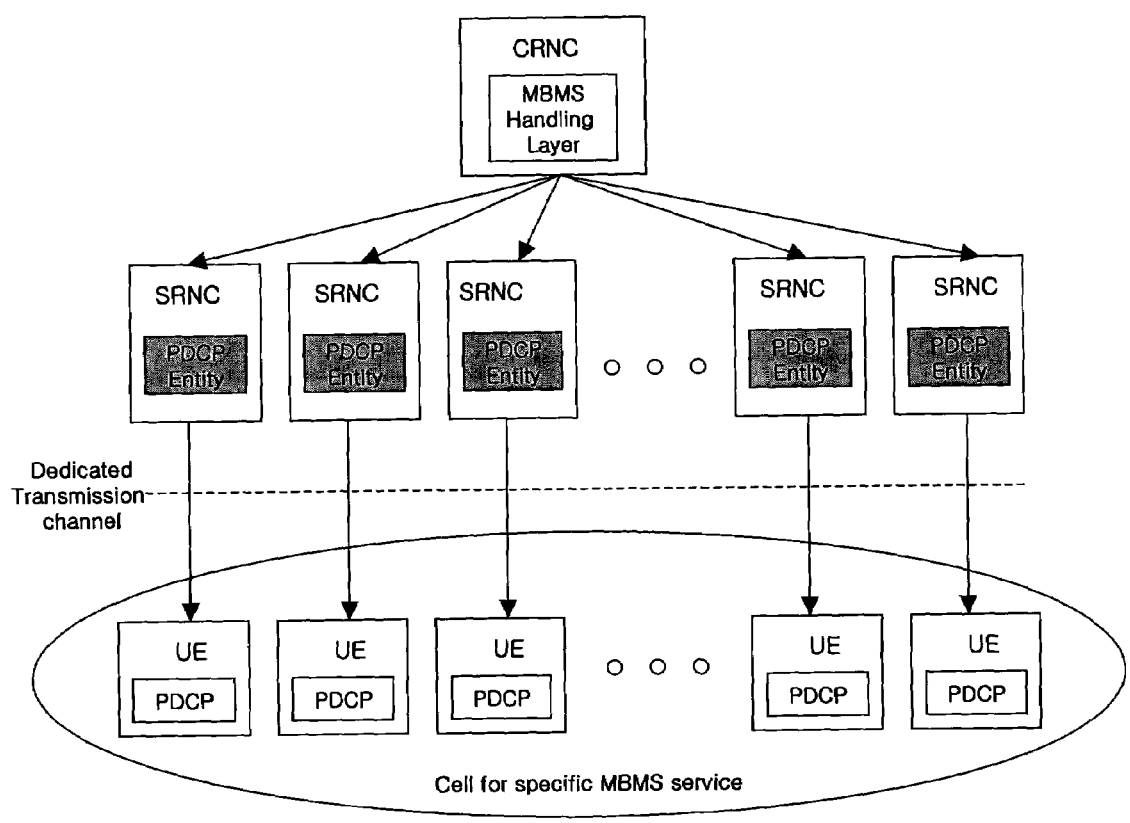
FIG. 5 illustrates a network structure for transmission of the MBMS in accordance with the conventional art.
Figure 6:
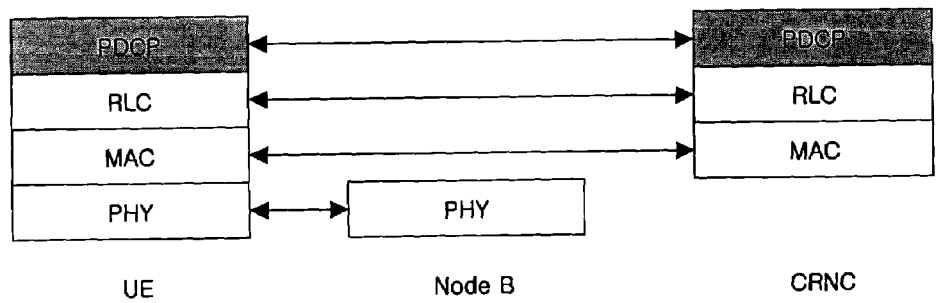
FIG. 6 illustrates a protocol stack for transmission of MBMS data in accordance with an embodiment of the present invention.

In order to address such problems, the inventors of the present invention considered the characteristics of providing MBMS, such as MBMS data being simultaneously transmitted to a plurality of terminals, and provided a solution to related art problems by providing a PDCP layer that handles header compression in the CRNC. That is, as shown in the protocol stack shown in FIG. 6, the PDCP is provided above the RLC layer, which is above the MAC layer at the CRNC.

In addition, in the present invention, MBMS data with a header compressed in a single PDCP layer within the CRNC, is transmitted to a terminal through the common transport channel. The common transport channel is a forward access channel (FACH) or a downlink shared channel (DSCH).

Figure 7:
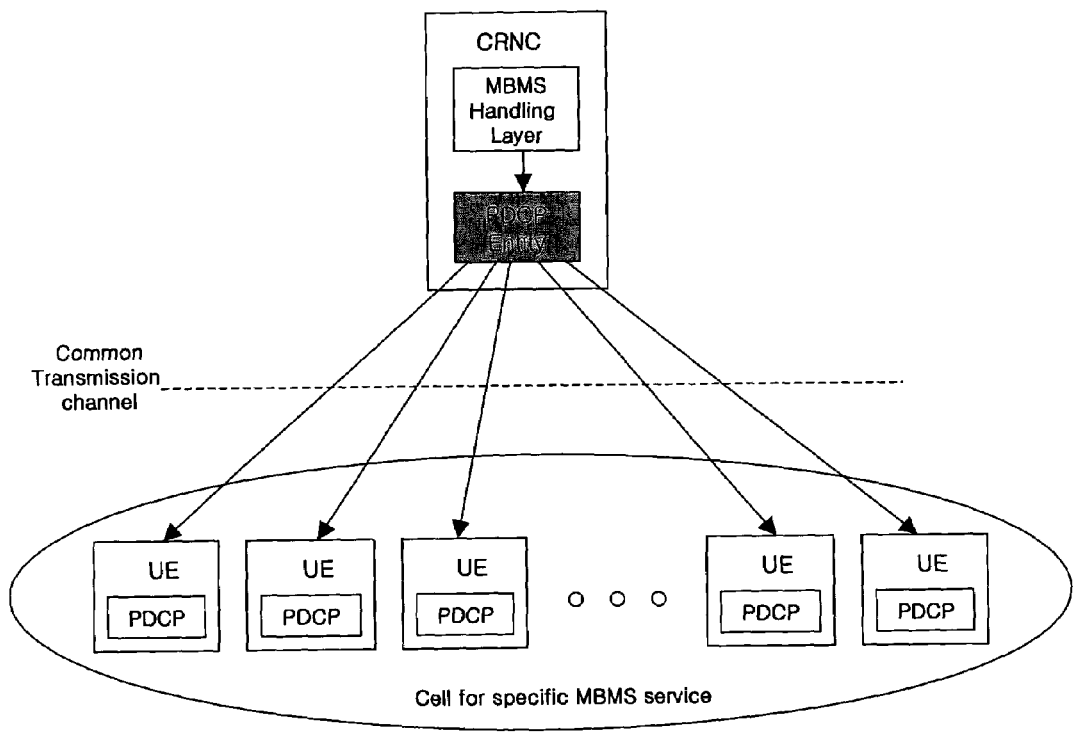
FIG. 7 illustrates a network structure for transmission of the MBMS in accordance with an embodiment of the present invention.

FIG. 7 illustrates a network structure for the transmission of the MBMS data in accordance with an embodiment of the present invention.

As shown in FIG. 7, when the PDCP layer, which compresses a header of MBMS data, exists at the CRNC, only one PDCP entity is required for each specific MBMS service in a cell irrespective of the number of terminals. That is, in the present invention, a radio (wireless) system is implemented such that one PDCP entity exists per cell in UTRAN for a specific MBMS service. Furthermore, each UE has its own PDCP entity for a specific MBMS service. Thus, for a specific MBMS service, if there are plural terminal which desires to receive the service, one PDCP entity in UTRAN is associated with plural PDCP entities that belong to the terminals.

Accordingly, for transmission of MBMS data, the MBMS handling layer of CRNC transmits the MBMS data to the PDCP layer, and then, the PDCP layer compresses a header of the received MBMS data and then transmits to a plurality of terminals, which desire to receive the specific MBMS data, through the common transport channel. Each PDCP layer of each terminal decompresses the received MBMS data and transmits it to the MBMS handling layer.

Also regarding FIG. 7, it can be noted that an embodiment of the present invention pertains to a method for providing multicast services in a radio communication system, the method performed by a network component, such as a radio network controller (RNC), comprises the steps of performing Internet protocol header compression to form header compressed data, and transmitting the header compressed data in a point-to-point manner and in a point-to-multipoint manner depending upon a threshold value, to one or more users of the radio communication system.

Alternatively, a method for providing multicast services according to the present invention comprises the steps of performing Internet protocol header compression to form header compressed data, and transmitting the header compressed data in a point-to-multipoint manner according to a type of multicast service to one or more users in the radio communication system.

Here, the Internet protocol header compression is respectively performed for each type of multicasting service to be provided. Also, the header compression is performed at a central location for each type of multicast service, wherein the central location is a packet data convergence protocol (PDCP) entity, and the PDCP entity is located within a controlling radio network controller (CRNC).

Also, it should be noted that the header-compressed data can be selectively transmitted in a point-to-point manner, in a point-to-multipoint manner, or both. The manner of transmission depends upon the conditions of the radio communication environment. For example, the point-to-point manner is employed if a total number of users within a cell is below the threshold value, while the point-to-multipoint manner is employed if a total number of users within a cell is at or above the threshold value.

The point-to-point manner is transmitting data from a single sending point to a single receiving point, which may be based upon a total number of users within a cell of the radio communication system.

Preferably, the point-to-point manner is performed in a serving radio network controller (SRNC). Here, the transmitting by point-to-point manner is via a dedicated channel. In contrast, the point-to-multipoint manner is performed in a controlling radio network controller (CRNC). Here, the transmitting by point-to-multipoint manner is via a common channel.

Based upon the above, it can be understood that a method for receiving multicast services at a user equipment (UE) can be performed with appropriate steps and procedures that oppose those steps and procedures used for providing (transmitting) the multicast service.

As so far described, in the present invention, when MBMS data having point-to-multipoint characteristics is header-compressed and transmitted, the PDCP layer for the MBMS is positioned at the CRNC, so that one PDCP entity exists for every specific MBMS service in a cell. In addition, the MBMS data with a header compressed in one PDCP entity is transmitted to the terminal through the common transport channel.

Accordingly, adopting the PDCP structure and the transmission method of the present invention resolves the problems of the related art in which the PDCP entities are repetitively provided for every specific MBMS service in a cell, each PDCP being provided in the SRNC and transmitted via a dedicated transport channel. Thus, waste of system resources of the UTRAN and radio resources can be prevented and transmission efficiency can be improved.

It should be noted that the particular network component (e.g., in a SRNC or a CRNC) that includes the PDCP layer for a specific MBMS service depends upon certain characteristics of the terminals (UE) located within a cell that wish to receive the specific MBMS service. For example, the characteristic of the terminals (UE) may be the total number of terminals (UE) wishing to receive the specific MBMS service. Namely, if the total number of terminals is equal to or greater than a threshold value, header compression is performed (at the PDCP layer) in a CRNC that manages shared resources within a cell, and downlink data transmission via a common transport channel is performed. If the total number is less than the threshold, header compression is performed (at the PDCP layer) in a SRNC that manages dedicated resources, and downlink data transmission via a dedicated transport channel is performed.

Thus, depending upon the total number of terminals within a cell, a terminal can receive via a common transport channel and restores (i.e., decompresses) the header-compressed data of the MBMS service that was transmitted after header compression at the CRNC, while a terminal can receive via a dedicated transport channel and restores (i.e., decompresses) the header-compressed data of the MBMS service that was transmitted after header compression at the SRNC.

Here, it can be understood that other characteristics, besides the total number of terminals may also be employed as needed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for providing point-to-multipoint services in a radio communication system, the method comprising:
    performing Internet protocol header compression to form header compressed data;
    in a point-to-point service, transmitting the header compressed data to one or more user equipment (UE) of the radio communication system;
    in a point-to-multipoint service, transmitting the header compressed data from a packet data convergence protocol (PDCP) entity to a plurality of UEs, wherein the header compressed data is transmitted over a common transport channel to each of the plurality of UEs of the radio communication system;
    wherein the Internet protocol header compression is performed in a PDCP entity located within a serving radio network controller (SRNC) in the case of the point-to-point service and within a controlling radio network controller (CRNC) in the case of the point-to-multipoint service,
    wherein in the case of the point-to-point service, the PDCP entity is located within a layer of a first network protocol stack that is located above a layer in which a radio link control (RLC) entity is located and above a layer in which a medium access control (MAC) entity is located;
    wherein the point-to-multipoint service is a multimedia broadcast/multicast service (MBMS) and one PDCP entity exists in the CRNC for the plurality of UEs of the radio communication system which individually receive the point-to-multipoint service from the CRNC in the case of the point-to-multipoint service, and
    wherein in the case of the point-to-multipoint service, the PDCP entity is located within a layer of a second network protocol stack, which does not include a physical layer, that is located above a layer in which a radio link control (RLC) entity is located, and above a layer in which a medium access control (MAC) entity is located.

2. The method of claim 1, wherein the point-to-point service is employed if a total number of users within a cell is below the threshold value.

3. The method of claim 1, wherein the point-to-multipoint service is employed if a total number of users within a cell is at or above the threshold value.

4. The method of claim 1, wherein the Internet protocol header compression is respectively performed for each type of MBMS service to be provided.

5. The method of claim 1, wherein the point-to-point service is transmitting data from a single sending point to a single receiving point.

6. The method of claim 5, wherein the point-to-point service is based upon a total number of users within a cell of the radio communication system.

7. The method of claim 6, wherein the transmitting by point-to-point manner is via a dedicated channel.

8. The method of claim 1, wherein the point-to-multipoint service is transmitting data from a single sending point to multiple receiving points.

9. The method of claim 8, wherein the point-to-multipoint service is based upon a total number of users within a cell of the radio communication system.

10. The method of claim 1, wherein the header compression is performed at a central location for each type of MBMS service.

11. The method of claim 1, wherein the MBMS service is a service that is provided to a specified plurality of users.

12. A method of receiving data of a point-to-multipoint service in a radio communication system, the method comprising:
    in a point-to-point service, receiving header compressed data from a radio communication system;
    in a point-to-multipoint service, receiving the header compressed data from a packet data convergence protocol (PDCP) entity over a common transport channel;
    decompressing the received header compressed data to allow a user to access the point-to-multipoint service,
    wherein the header compressed data is formed in a PDCP entity located within a serving radio network controller (SRNC) in the case of the point-to-point service and within a controlling radio network controller (CRNC) in the case of the point-to-multipoint service,
    wherein in the case of the point-to-point service, the PDCP entity is located within a layer of a first network protocol stack that is located above a layer in which a radio link control (RLC) entity is located and above a layer in which a medium access control (MAC) entity is located;
    wherein the point-to-multipoint service is a multimedia broadcast/multicast service (MBMS) and one PDCP entity exists in the CRNC for the users of the radio communication system which individually receive the point-to-multipoint service from the CRNC in the case of the point-to-multipoint service, and
    wherein in the case of the point-to-multipoint service, the PDCP entity is located within a layer of a second network protocol stack, which does not include a physical layer, that is located above a layer in which a radio link control (RLC) entity is located, and above a layer in which a medium access control (MAC) entity is located.

13. The method of claim 12, wherein the point-to-point service is receiving data by a single receiving point from a single sending point.

14. The method of claim 13, wherein the point-to-point service is based upon a total number of users within a cell of the radio communication system.

15. The method of claim 13, wherein the receiving by point-to-point service is via a dedicated channel.

16. The method of claim 12, wherein the point-to-multipoint service is receiving data by multiple receiving points from a single sending point.

17. The method of claim 16, wherein the point-to-multipoint service is based upon a total number of users within a cell of the radio communication system.

18. The method of claim 12, wherein the MBMS service is a service that is received by a specified plurality of users.

19. A radio communication system for providing and receiving data of a point-to-multipoint service, the radio communication system comprising:
    one or more terminals;
    a radio network controller coupled to the one or more terminals, the radio network controller comprising:
    a header compressing portion that performs Internet protocol header compression to form header compressed data; and
    a transmitter portion configured to:
        in a point-to-point service, transmit the header compressed data to one or more user equipment (UE) of the radio communication system;
        in a point-to-multipoint service, transmit the header compressed data from a packet data convergence protocol (PDCP) entity to a plurality of UEs, wherein the header compressed data is transmitted over a common transport channel to each of the plurality of UEs of the radio communication system;
    wherein the point-to-multipoint service is a multimedia broadcast/multicast service (MBMS) and one PDCP entity exists in the CRNC for the plurality of UEs of the radio communication system which individually receive the point-to-multipoint service from the CRNC in the case of the point-to-multipoint service, and
    wherein in the case of the point-to-point service, the PDCP entity is located within a aver of a first network protocol stack that is located above a layer in which a radio link control (RLC) entity is located and above a layer in which a medium access control (MAC) entity is located, and
    wherein in the case of the point-to-multipoint service, the PDCP entity is located within a layer of a second network protocol stack, which does not include a physical layer, that is located above a layer in which a radio link control (RLC) entity is located, and above a layer in which a medium access control (MAC) entity is located.

20. The radio network controller of claim 19, wherein the PDCP entity respectively performs header compression for each type of MBMS service to be provided.

21. The radio network controller of claim 19, wherein the SRNC transmits via a dedicated transport channel.

22. In a radio communication system for providing and receiving data of a point-to-multipoint service, a user equipment comprising:
    a receiving portion configured to:
        in a point-to-point service, receive header compressed data from a radio communication system;
        in a point-to-multipoint service, receive the header compressed data from a packet data convergence protocol (PDCP) entity over a common transport channel;
    a header decompressing portion operatively connected with the receiving portion, the header decompressing portion decompressing the received header compressed data to allow a user to access the point-to-multipoint service,
    wherein the header compressed data is formed in a PDCP entity Located within a serving radio network controller (SRNC) in the case of the point-to-point service and within a controlling radio network controller (CRNC) in the case of the point-to-multipoint service,
    wherein in the case of the point-to-point service, the PDCP entity is located within a layer of a first network protocol stack that is located above a layer in which a radio link control (RLC) entity is located and above a layer in which a medium access control (MAC) entity is located;
    wherein the point-to-multipoint service is a multimedia broadcast/multicast service (MBMS) and one PDCP entity exists in the CRNC for the users of the radio communication system which individually receive the point-to-multipoint service from the CRNC in the case of the point-to-multipoint service, and
    wherein in the case of the point-to-multipoint service, the PDCP entity is located within a layer of a second network protocol stack, which does not include a physical layer, that is located above a layer in which a radio link control (RLC) entity is located, and above a layer in which a medium access control (MAC) entity is located.

23. The user equipment of claim 22, wherein the receiving portion receives via a dedicated transport channel.

24. A method for providing point-to-multipoint services in a radio communication system, the method comprising:
    performing Internet protocol header compression to form header compressed data; and
    in a point-to-point service, transmitting the header compressed data to one or more user equipment (UE) of the radio communication system;
    in a point-to-multipoint service, transmitting the header compressed data from a packet data convergence protocol (PDCP) entity to a plurality of UEs, wherein the header compressed data is transmitted over a common transport channel to each of the plurality of UEs of the radio communication system;
    wherein the Internet protocol header compression is performed in a PDCP entity located within a serving radio network controller (SRNC) in the case of the point-to-point service and within a controlling radio network controller (CRNC) in the case of the point-to-multipoint service,
    wherein in the case of the point-to-point service, the PDCP entity is located within a layer of a first network protocol stack that is located above a layer in which a radio link control (RLC) entity is located and above a layer in which a medium access control (MAC) entity is located;
    wherein the point-to-multipoint service is a multimedia broadcast/multicast service (MBMS) and one PDCP entity exists in the CRNC for the plurality of UEs of the radio communication system which individually receive the point-to-multipoint service from the CRNC in the case of the point-to-multipoint service, and
    wherein in the case of the point-to-multipoint service, the PDCP entity is located within a layer of a second network protocol stack, which does not include a physical layer, that is located above a layer in which a radio link control (RLC) entity is located, and above a layer in which a medium access control (MAC) entity is located.

25. A method of providing Internet protocol header information in a wireless communication system, the method comprising:
    performing header compression of Internet protocol header information to form compressed header data; and
    in a point-to-point service, transmitting the header compressed data to one or more terminals of the wireless communication system;
    in a point-to-multipoint service, transmitting the header compressed data from a packet data convergence protocol (PDCP) entity to a plurality of terminals, wherein the header compressed data is transmitted over a common transport channel to each of the plurality of terminals of the wireless communication system;

wherein the Internet protocol header compression is performed in a PDCP entity located within a serving radio network controller (SRNC) in the case of the point-to-point service and within a controlling radio network controller (CRNC) in the case of the point-to-multipoint service, wherein in the case of the point-to-point service, the PDCP entity is located within a layer of a first network protocol stack that is located above a layer in which a radio link control (RLC) entity is located and above a layer in which a medium access control (MAC) entity is located;

wherein the point-to-multipoint service is a multimedia broadcast/multicast service (MBMS) and one PDCP entity exists in the CRNC for the plurality of terminals of the wireless communication system which individually receive the point-to-multipoint service from the CRNC in case of the point-to-multipoint service, and wherein in the case of the point-to-multipoint service, the PDCP entity is located within a layer of a second network protocol stack, which does not include a physical layer, that is located above a layer in which a radio link control (RLC) entity is located, and above a layer in which a medium access control (MAC) entity is located.

26. The method of claim 25, wherein the header compression is performed once for the data transmitted to the plurality of terminals when the data is transmitted in the point-to-multipoint manner.

27. The method of claim 25, wherein the compressed header data is provided to the plurality of terminals when the data is transmitted in the point-to-multipoint manner.

28. The method of claim 25, wherein the threshold value is associated with a number of terminals.

29. The method of claim 25, wherein at least part of the Internet protocol header information is not compressed.

30. A wireless communication system for providing Internet protocol header information, the wireless communication system comprising:

one or more terminals;

a radio network controller coupled to the one or more terminals, the radio network controller comprising:

a header compression module adapted to receive Internet protocol header information from an internet protocol module and compress the Internet protocol header information to form compressed header data;

a transmitter module configured to:

in a point-to-point service, transmit the header compressed data to one or more terminals of the wireless communication system; and in a point-to-multipoint service, transmit the header compressed data from a packet data convergence protocol (PDCP) entity to a plurality of terminals, wherein the header is transmitted over a common transport channel to each of the plurality of terminals of the wireless communication system;

a receiving module configured to:

in a point-to-point service, receive header compressed data from the wireless communication system;

in a point-to-multipoint service, receive the header compressed data over a common transport channel from the wireless communication system;

wherein in the case of the point-to-point service, the PDCP entity is located within a layer of a first network protocol stack that is located above a layer in which a radio link control (RLC) entity is located and above a layer in which a medium access control (MAC) entity is located;

wherein a multimedia broadcast/multicast service (MBMS) is provided to the plurality of terminals and one PDCP entity exists in the CRNC for the plurality of terminals of the wireless communication system which individually receive the point-to-multipoint service from the CRNC in the case of the point-to-multipoint service, and wherein in the case of the point-to-multipoint service, the PDCP entity is located within a layer of a second network protocol stack, which does not include a physical layer, that is located above a layer in which a radio link control (RLC) entity is located, and above a layer in which a medium access control (MAC) entity is located.

31. The wireless communication system of claim 30, wherein the compressed header data is provided to the plurality of terminals when the data is transmitted in a point-to-multipoint manner.

32. The wireless communication system of claim 30, wherein the compressed header data is transmitted in the point-to-point manner if the number of terminals is below the threshold value.

33. The wireless communication system of claim 30, wherein the compressed header data is transmitted in the point-to-multipoint manner if the number of terminals is at or above the threshold value.

* * * * *